(12) United States Patent
Nilsson et al.

(10) Patent No.: US 6,680,690 B1
(45) Date of Patent: Jan. 20, 2004

(54) POWER EFFICIENCY CIRCUIT (75) Inventors: Valter Nilsson, Hovås (SE); Pär Abrahamsson, Linköping (SE)

(73) Assignee: SAAB Marine Electronics AB, Göteborg (SE)

( * ) Notice: Subject to any disclaimer, the term of this patent is extended or adjusted under 35 U.S.C. 154(b) by 0 days.

(21) Appl. No.: 10/375,046

(22) Filed: Feb. 28, 2003

(51) Int. Cl.$^7$ ............................................... G01S 13/32
(52) U.S. Cl. ...................................... 342/124; 342/118
(58) Field of Search ............................... 342/118–124; 324/644; 73/290 R, 290 B, 290 V, 304 R, 304 C, 305–322, 322.5

(56) References Cited

U.S. PATENT DOCUMENTS

| | | | |
|---|---|---|---|
| 4,485,673 A | * 12/1984 | Stern | 73/304 C |
| 4,849,754 A | * 7/1989 | Maltby et al. | 340/870.38 |
| 5,416,723 A | 5/1995 | Zyl | |
| 5,672,975 A | 9/1997 | Kielb et al. | |
| 5,987,994 A | * 11/1999 | Maltby et al. | 73/646 |
| 6,014,100 A | 1/2000 | Fehrenback et al. | |
| 6,320,532 B1 | 11/2001 | Diede | |
| 6,404,382 B2 | * 6/2002 | Fehrenbach et al. | 342/124 |
| 6,535,161 B1 | * 3/2003 | McEwan | 342/124 |
| 6,539,794 B1 | * 4/2003 | Otto et al. | 73/290 V |
| 2002/0005713 A1 | 1/2002 | Klofer et al. | |

FOREIGN PATENT DOCUMENTS

| | | |
|---|---|---|
| EP | 1202427 | 5/2002 |
| WO | 02/44748 | 6/2002 |

* cited by examiner

*Primary Examiner*—Thomas H. Tarcza
*Assistant Examiner*—Isam Alsomiri
(74) *Attorney, Agent, or Firm*—Swidler Berlin Shereff Friedman, LLP (57) ABSTRACT

A radar level gauge for measuring a level of a surface of a product in a tank having a two-wire process control loop, output circuitry coupled to the two-wire process control loop for setting in the loop a desired value of a loop current ($I_{loop}$) corresponding to the product level, a power supply circuitry coupled to the two-wire process control loop for receiving power from the loop and being a source of power for a microwave source, a microwave receiver, a measurement circuitry and the output circuitry and including a converter for transferring power from the loop to said power supply circuitry by means of feeding a first current ($I_{DC/DC}$) from the loop to the power supply circuitry, a current generator included in said output circuitry for generating in parallel to said first current a second current ($I_{sh}$) in the loop for maintaining said loop current at a value corresponding to said product level and a sensing circuit for determining the value of said second current and having an output indicative of the value of said second current.

27 Claims, 4 Drawing Sheets

Prior art

Fig. 6c

POWER EFFICIENCY CIRCUIT

TECHNICAL FIELD

The present invention relates to level measurement in industrial processes, wherein the invention is used for measurement of product level in a storage tank of the type used in industrial applications using a microwave level gauge. More specifically, the present invention relates to a device and a method for efficient use of power provided to the gauge from a two-wire process control loop.

BACKGROUND AND RELATED ART

Instrumentation for the measurement of product level (either liquids or solids) in storage vessels is evolving from contact measurement techniques, such as tape and float, to non-conduct techniques. One technology is based on the use of microwaves, which involves transmitting microwaves towards the product surface and receiving reflected microwaves from the surface. The reflected microwaves are analyzed to determine the distance that they have travelled. Knowledge of the distance travelled allows determination of the product level.

Often used in the process control industry are the 4–20 mA process control loops. In these loops a 4 mA signal represents a zero reading and a 20 mA signal represents a full-scale reading. Further, if a transmitter in the field has sufficiently low power requirements, it is possible to power the transmitter using current from the two-wire loop. However, microwave transmitters for level gauging in the process control industry have often required a separate power source. These microwave transmitters were large and their operation required more power than could be delivered using 4–20 mA standard. Thus typical prior art microwave transmitters for level gauging required additional wiring to provide power to the unit.

The document U.S. Pat. No. 5,672,975 discloses an arrangement for providing power to a radar level gauge and for transmitting level information provided by the radar level gauge by means of a two-wire process control loop. The term radar level gauge is here used for a unit including an antenna unit, a microwave transmitter, a receiver, transmitter and receiver circuits and circuits for calculating a measured level.

Figure 1:
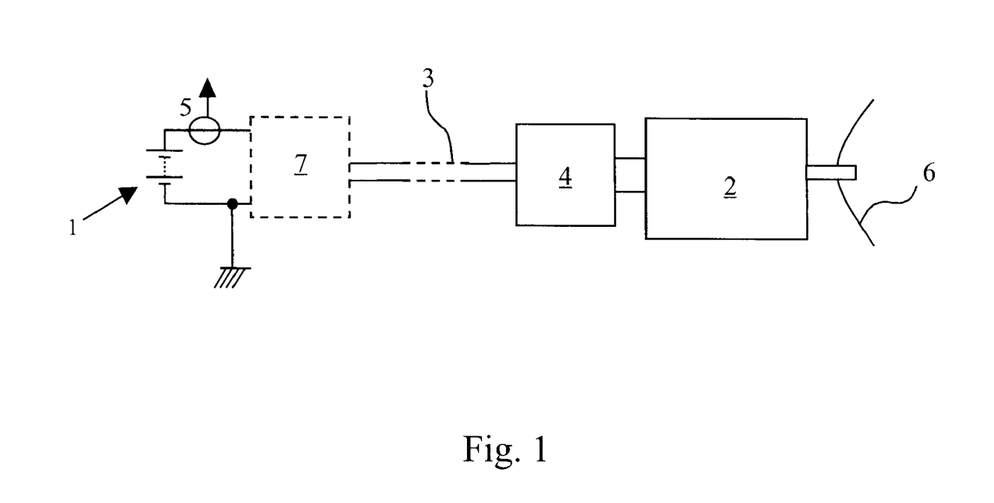
FIG. 1 shows a prior art two-wire radar level gauge.

A two-wire radar level gauge is distinguished by that it is being supplied by power and at the same time communicating analogue and digital information through the same wires. A prior art two-wire radar level gauge can be coupled as is shown in FIG. 1. A voltage source 1 is supplying the radar level gauge 2 with power through the two-wire loop 3. A barrier 4 for protection against current transients and for containing an EMC-filter may be included in an interface between the gauge and the loop. The gauge is conveying an actual measured value to a control unit 5 by setting a current proportional to the level value measured. This current can be set in the interval 4–20 mA. An antenna unit 6 is included in the gauge.

To make it possible to span the loop current over the whole 4–20 mA interval, the internal power consumption of the radar level gauge must be lower than or equal to 4 mA. This lowest limit is valid for a measured value that is represented by the lowest value to be conveyed by the loop. In reality not even as much as 4 mA current from the loop is available for powering the gauge. Current available for the supply of the gauge is approximately 3,5 mA. The reason for this is that the gauge is set to send a low level alarm when the reading is below the lower end of the current range 4 to 20 mA used for transmission of data via the loop.

A two-wire loop is characterized by that only two wires are needed for connecting an instrument to a controller. The length of the wires may be up to several hundreds of meters. The wires are also used for the communication between the instrument and the controller. Said communication may be analogue in the 4–20 mA interval as stated. Digital bi-directional communication according to e.g. the known HART protocol is also possible to use in said interval.

Equipment which is to be located in explosive environments is subjected to authority demands. It is common that equipment is then designed and certified as "explosive safe" or "intrinsic safe".

Safety against explosion is guaranteed, in general, by use of a casing, which complies with certain requirements. Such equipment may be powered via a barrier to limit the energy that is fed out to the wires and to the gauge. Intrinsic safe means that the construction in itself is designed in such a way, that electric energy is not available in a sufficient amount to generate a spark, which can set fire to an explosive gas surrounding the construction. From practical reasons, this means that there is a barrier at the entrance to those parts being classified as intrinsic safe. Either a barrier 4 or a barrier 7 exemplifies this.

For a radar level gauge, parts of the equipment that must be located inside, for example, an oil container has to be intrinsic safe. As a result there is required a barrier that limits, with high security, energies possibly available at wave guides and antenna parts.

The input voltage to the gauge at the loop end changes depending on the barrier used, supply cable characteristics, loop current, losses in the gauge and supply voltage. A loop power supply is located remote from the gauge, often at the same location as the receiver of data from the gauge. A typical remote supply voltage is 24 V and the total resistance in the loop is often 500 ohms or more. Consequently, the input voltage at the gauge terminals can vary within a 10 V interval as the voltage drop across the loop can reach 10 V at 20 mA in the loop.

Figure 3:
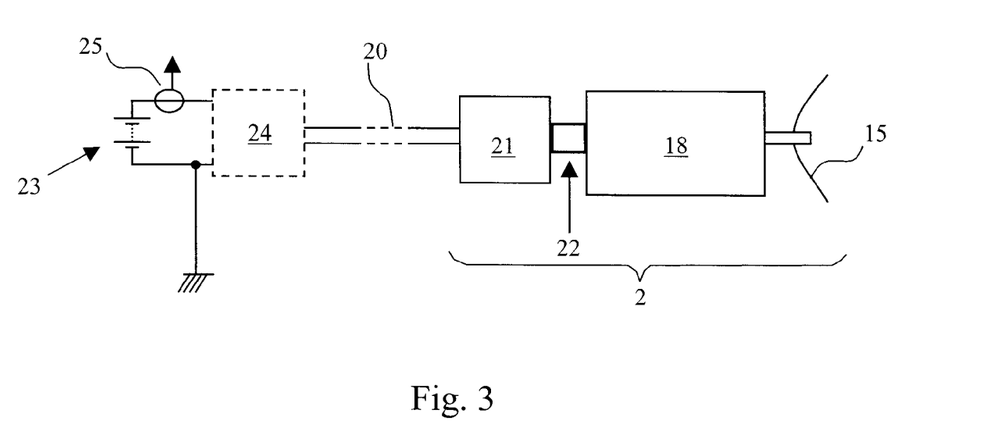
FIG. 3 shows a schematic view of a radar level gauging system used in the invention.
Figure 4:
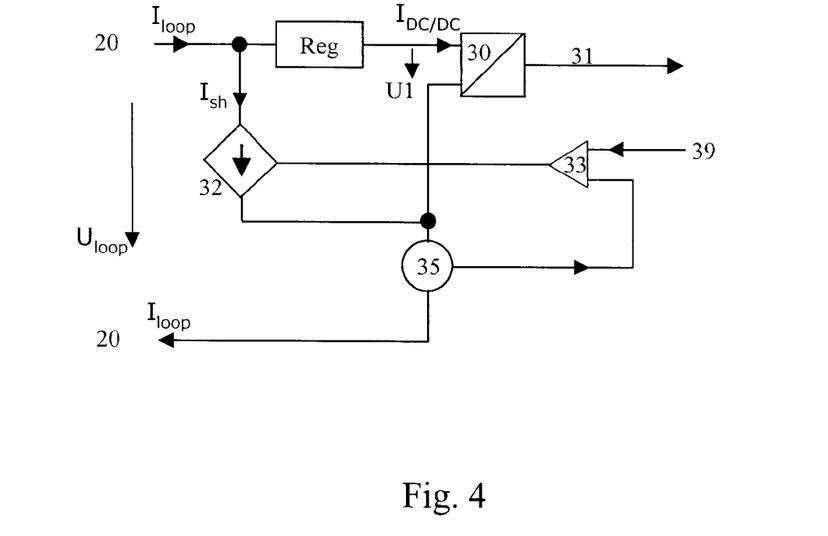
FIG. 4 shows a schematic view of a converter for transferring power from the loop to the gauge.

Document SE 0203456-9, not yet published at the filing date of this application, discloses the use of a DC/DC-converter for supplying the gauge with power from the loop. The content of said document is hereby incorporated into this description by reference. FIGS. 3 and 4 illustrate a converter according to the disclosure of said document. The converter of said disclosure further has the purpose to isolate the gauge from the loop. The total power consumed in the gauge is $U_{loop} * I_{loop}$. See FIG. 4 (FIGS. 3 and 4 are described more in detail in the embodiments below). The total current $I_{loop}$ is divided into the current $I_{DC/DC}$, which is used for powering the measurement circuits of the gauge, and a shunt current $I_{sh}$. Said total current $I_{loop}$ is the current corresponding to the value measured by the gauge. As seen from the loop, the input terminals of the converter of FIGS. 3 and 4 are the input terminals to the gauge. The power consumed is used to energize the gauge. The amount of power required to supply the gauge is usually a portion of the total consumed power. A converter of the kind used to transfer power from the loop to the gauge as shown has a built-in feature that the input power to the converter is fairly constant over a wide input voltage range. Excessive power is dissipated in a device, a current generator, controlled by the gauge to stabilize the loop current to an amplitude that corresponds to the present reading of product level. Limitations arise when the power required by the gauge exceeds the available power from the loop. In reality, this available power sets a limit, a threshold, for minimum operational input voltage for the gauge. Said threshold is here called "lift-off voltage". The term lift-off voltage is used to indicate the voltage level that must be available for the gauge to perform as defined at a certain current. If the available voltage for the gauge is below the required lift-off voltage at said certain current the power is not high enough to energize the gauge. The value of the lift-off voltage is generally lower when high loop current is prevailing as the loop can supply required power without limitation.

A way to solve the problem with insufficient power to the gauge is described in document U.S. Pat. No. 6,014,100. In said document the measurement of the level of the product is made in an active cycle between energy storing cycles. The transmission/receive unit is completely switched off during a temporary power store cycle and is inoperative until the start of the next active cycle. A drawback with this solution is that the transmission/receive unit is unavailable during energy storing cycles.

Another way to solve the same problem in a gauge is shown in document U.S. Pat. No. 5,416,723. In said document an invention is disclosed, where a power regulating circuit is associated with a circuit configured to sense a deficit in its capability to supply the circuits of the gauge with power and to delay the execution of a program stored in the gauge for control of the measuring of the level by the gauge. The program is delayed sufficiently in response to the sensing of the deficit to reduce the power required by the gauge to overcome the deficit. A drawback of the disclosure is further that a loop current setting means is connected in series with the transducer, whereby the full loop current is passing said setting means and thus imparting a voltage drop across said setting means in the loop.

Patent application U.S. Pat. No. 2002/0005713 A1 discloses a device, a gauge powered from a loop, which shows a way to approximate the power consumption of a gauge to predetermined power consumption without the predetermined power consumption being exceeded. The measuring operations are then regulated in a way such that a power surplus is minimized.

The object of the present invention is to provide a circuit for a radar level gauge powered via a two-wire control loop for sensing the surplus power transferred in the loop and for use of said surplus power in increasing performances of the gauge.

SUMMARY OF THE INVENTION

According to one aspect of the invention, there is presented a two-wire powered radar level gauge comprising the features:

the radar level gauge uses microwaves and is coupable to a two-wire process control loop for measuring a level of a surface of a product in a tank and the radar level gauge further comprising, a microwave antenna unit directed into the tank, a microwave source for sending a microwave signal through the antenna unit into the tank, a microwave receiver for receiving a reflected microwave signal from the surface of the product in the tank, measurement circuitry coupled to the source and receiver for initiating transmission of the microwave signal and for determining product level based upon the received signal, output circuitry coupled to the two-wire process control loop for setting in the loop a desired value of a loop current ($I_{loop}$) corresponding to the product level, a power supply circuitry coupled to the two-wire process control loop for receiving power from the loop and being a source of power for the microwave source, the microwave receiver, the measurement circuitry and the output circuitry and including a converter for transferring power from the loop to said power supply circuitry by means of feeding a first current ($I_{DC/DC}$) from the loop to the power supply circuitry, a current generator included in said output circuitry for generating in parallel to said first current a second current ($I_{sh}$) in the loop for maintaining said loop current at a current level corresponding to said product level and a sensing circuit for determining the value of said second current and having an output indicative of the value of said second current.

According to a second aspect of the invention, there is presented a method for measuring a level of a surface of a product in a tank by means of a radar level gauge using microwaves, wherein said gauge is coupled to a two-wire process control loop and the method further comprising the steps:

directing an antenna unit into the tank, sending by means of a microwave source a microwave signal through the antenna unit into the tank, receiving by means of a receiver a microwave signal reflected from a surface of the product in the tank, initiating transmission of the microwave signal and determining product level based upon the received signal in a measurement circuit coupled to the microwave source and the microwave receiver, setting in an output circuitry situated in the radar level gauge and coupled to the two-wire process control loop a loop current value ($I_{loop}$) corresponding to the product level, transmitting information related to product level over the loop via said output circuitry, supplying power from the loop to a power supply circuitry being a source of power for the microwave source, the microwave receiver, the measurement circuitry and the output circuitry, transferring power from the loop to said power supply circuitry by means of feeding a first current ($I_{DC/DC}$) from the loop to the power supply circuitry, generating a second current ($I_{sh}$) in the loop for maintaining said loop current at the value corresponding to said measured value of said product level, determining in a sensing circuit a value of the current generated in the loop and sending an alarm via the loop when the value of said generated current indicates that the power available via the loop is insufficient to energize the gauge and outputting from said sensing circuit an output signal indicating the value of said generated current.

The invention uses the sensing circuit, which senses current generated in said current generator for allowing excessive power available to be used for powering equipment in the radar level gauge. In one embodiment the sensing circuit is used for switching the gauge between two modes, one base mode for providing basic measuring functions with power and one extended mode, wherein further functions are allowed to operate.

The converter included in the level gauging system is transforming the voltage from the loop to an over-voltage protected and current limited low feed voltage to the electric circuits of the gauge. The converter can at the same time be supervised to load the loop in said extended mode with currents between 4 and 20 mA. Process signals (such as HART signals) from and to the gauge can be handled by the circuit (not shown) and transmitted in both directions.

With the sensing circuit it is possible to determine when lift-off voltage is reached, whereby it will be possible to utilize power available from the loop more efficiently. The gauge can be made to adapt its function or performance depending on available power supplied. The gauge can also be operational from lower input voltage. Specific areas where the detected available power can be used are the powering of circuits for:

Controlled start-up and shut down of the level gauging system,

Controlling slow-down processes in the gauge to lower the power consumption,

Activating stand-by modes,

Controlling connection and disconnection of certain functions or to switch to alternative modes of operation to affect the power consumption and by this offer an extended input voltage interval for the gauge, Starting optional functions, Charging electrical storage means, such as a capacitor or a battery, in the gauge with sensed excessive power.

Discrete measures that can be fulfilled with the circuit according to the invention, when the sensing circuit activates an alarm indicating that the lift-off voltage is reached:

Clock speeds in digital circuits can be changed

The measurement updating intervals can be changed

Parts or functions in the gauge, which are not necessary for the basic functions of the gauge, can be disconnected, Functions used for service or for maintenance of the gauge can be disconnected.

The circuit according to the invention aspects can be used for a better control of the gauge when the supply voltage is switched off or if the voltage for a short while would fall outside normal levels. Situations where circuits are locked due to uncontrolled high current level during e. g. start can be eliminated. Setting the sensing circuit to connect a low power stand by state of rest when the power supply cannot fulfil the demands for normal performances can provide this function.

Further advantages are that the level gauging system can be programmed to use available energy for optimum operational performance at any time and that the sensing circuit can be used for supervision of loop supply. The lift-off voltage can be detected at any loop current.

The proposed circuit increases the efficiency of the gauge compared to a conventional solution as functions of the gauge can be controlled in such a way that the voltage interval in which the gauge will work is expanded.

EMBODIMENTS OF THE INVENTION

Examples of embodiments of the invention are here described with support of the enclosed figures.

Figure 2:
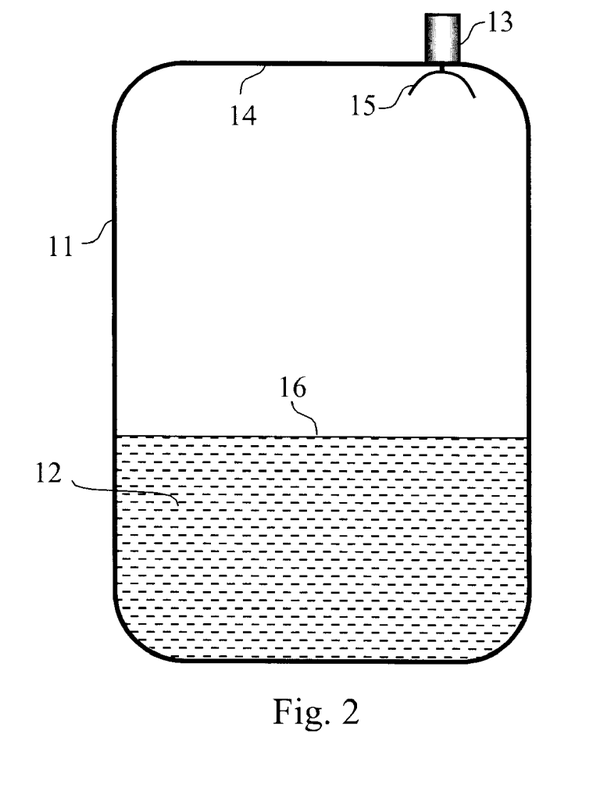
FIG. 2 schematically shows an example of a radar level gauging system for determining the level of the surface of a product in a tank.

An application of a radar level gauge is shown in FIG. 2. A tank 11 is used for storing a product 12. The product may be such as oil, refined products, chemicals and liquid gas, or may be a material in powder form. Radar 13 is attached to the roof 14 of the tank 11. A microwave beam is transmitted from the radar via an antenna 15 at the interior of the tank. The transmitted beam is reflected from the surface 16 of the product and is received by the antenna 15. By means of a comparison and evaluating of the time lap between transmitted and reflected beam in a measuring and controlling unit, a determination of the level of the product surface 16 in a known manner is performed. The microwave may be transmitted from the antenna a free radiated beam or via a wave guide (not shown), which communicates with the product. The radar level gauge as shown in FIG. 2 is only used as an example.

The location of the converter for transferring the power from the loop to the gauge in a level gauging system according to the invention is illustrated in FIG. 3. FIG. 2 refer to the radar level gauge unit. The antenna 15 is connected via a microwave transmission line to gauge electronics 18 containing the radar transmitter, the radar receiver, the measurement circuitry and the output circuitry. Said gauge electronics is connected to the two-wire loop 20 over a transient protection and EMC-filter barrier 21, which in this embodiment is located at the input to the radar level gauge 2. There is further provided a converter 22 between said barrier and the gauge electronics. Power to the radar level gauge is provided by a voltage supply 23 feeding the two-wire loop via a second barrier 24, if required, to render the feeding line intrinsic safe. In the loop, there is further provided receiving means 25 for receiving the value of the level of the product in the tank, wherein said value is based on a reading of the current in the loop 20.

A prior converter 22 for the transfer of power to the gauge is described in FIG. 4 and illustrated by only a few blocks as depicted in said figure. In this figure the loop is referred to by number 20. The loop current $I_{loop}$ is divided into two branches, one portion $I_{DC/DC}$ is lead through a DC/DC-converter 30 having an output 31. The current $I_{DC/DC}$, which is not allowed to exceed 4 mA is distributed via a regulator Reg and then sent to the converter 30, which is supplying the internal electronics of the gauge illustrated by means of block 18 with an adapted voltage(s). The regulator Reg normally stabilizes/limits a voltage U1 over the converter to a level, which is substantially, lower than the nominal supply voltage $U_0$. The other portion $I_{sh}$ of the loop current is let through a current generator 32. The current generator 32 controls the current through the loop, whereby said current is set by a comparator 33, which gets information about actual value of the current delivered from loop current measuring means 35. To the comparator 33 a desired current value 39 is sent from the level sensing instruments of the gauge, whereby the comparator 33 can set the current of the loop by controlling the current generator 32.

The power which will be the available power resource for the internal electronics of the gauge in previous solutions is settled by $I_{loop}$=4 mA and the voltage to which U1 has been designed and further the efficiency of the DC/DC converter. The design of the gauge is thus a balance between functionality and performances in dependence of the power available.

Figure 5:
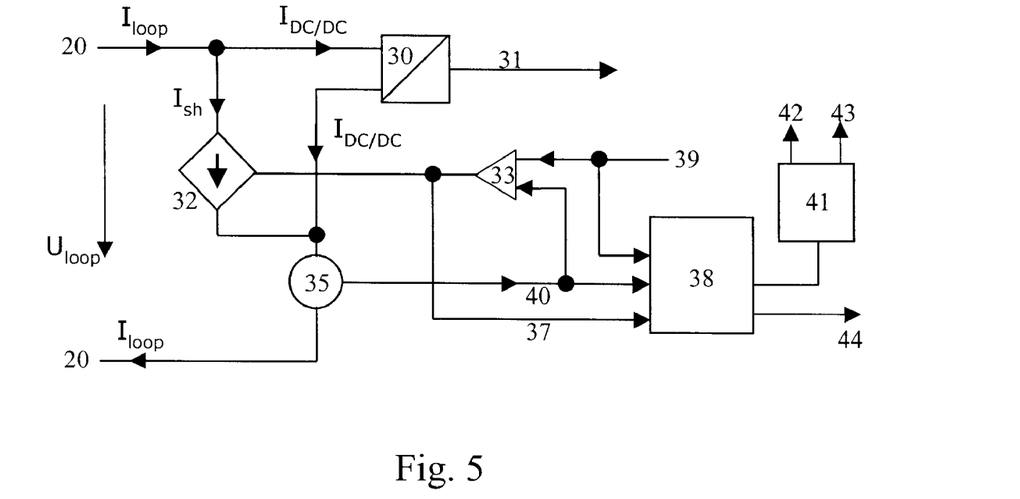
FIG. 5 schematically shows a view of a circuit controlling the loop current and for an efficient use of said current according to an aspect of the invention.

One embodiment of the circuit disclosed in the aspect according to the invention is shown in FIG. 5. In this solution the influence of the regulator is eliminated as it is removed at the same time as the circuit as described in FIG. 4 is enlarged with some components. Thus, there is included in the circuit of FIG. 5 a sensing circuit 38. The actual measured loop current represented by loop current signal 40 is compared with the desired loop current represented by desired loop current signal 39, the reference value of the current. The inverted error of these two signals is amplified and controls the current generator 32 in order to maintain a current in the loop that within the interval 4–20 mA corresponds to the desired current obtained via the current loop control which delivers the desired loop current signal 39. According to the invention the circuit includes said sensing circuit 38, which measures the feedback signal being loop current signal 40, the desired loop current signal 39 and further the drive signal 37 to the current generator 32. By the information obtained from these three signals 40, 39 and 37 the sensing circuit 38 determines whether current flows through the current generator 32 or not.

Information to the sensing circuit 38 that current $I_{sh}$ is floating through the current generator 32 and the level of said current is sent to a power controller 41. As long as current is generated and flowing through the current generator 32, there is excessive current available for providing the gauge with surplus power through the converter 30, which means that excessive power instead of just being transferred into heat is used for internal power supply of exemplified receivers 42, 43 of said powered functions and processes in the gauge electronics requiring additional DC power from the DC/DC converter. Said power controller 41 is thus programmed to administer distribution of available current to said receivers of surplus power or the disconnection/standby mode of said functions and processes when surplus power is not available. The level gauging system can thus be programmed to use available energy for optimum operational performance at any time. The circuit can also be used for supervision of loop supply. The lift-off voltage can be detected at any loop current. In that the sensing circuit 38 supervises said signals 40, 39 and 37 (corresponding to loop current, desired loop current and the drive signal to the current generator) detection of when the loop current control ceases to function is achieved. This occurs at a certain voltage limit (the lift-off voltage) at the input of the gauge in dependence of the current in the loop as described. The sensing circuit 38 sends an alarm to the power controller 41 if said limit is reached.

The DC/DC converter must of course be designed for conversion of the higher power requested by the gauge electronic circuits. The circuit offers increased amount of output power at higher operational voltages, which thus is used for providing extended performances of the gauge.

The sensing circuit 38 is included into the system to provide the use of energy available from the loop more effectively, whereby the sensing circuit 38 controls:

the power controller 41 to supply energy from converter 31 to gauge functions, which require energy in excess of the base function of the gauge, whereby this means that a main part of a current $I_{sh}$ that would have been generated in the current generator instead is redirected to flow through the converter ($I_{DC/DC}$);

the loop current $I_{loop}$ to be maintained at a level that corresponds to the measured value of the product level;

the delivering of an alarm signal 44 via the loop when the input voltage $U_{loop}$ to the gauge is not sufficient to energize the gauge.

Figure 6A:
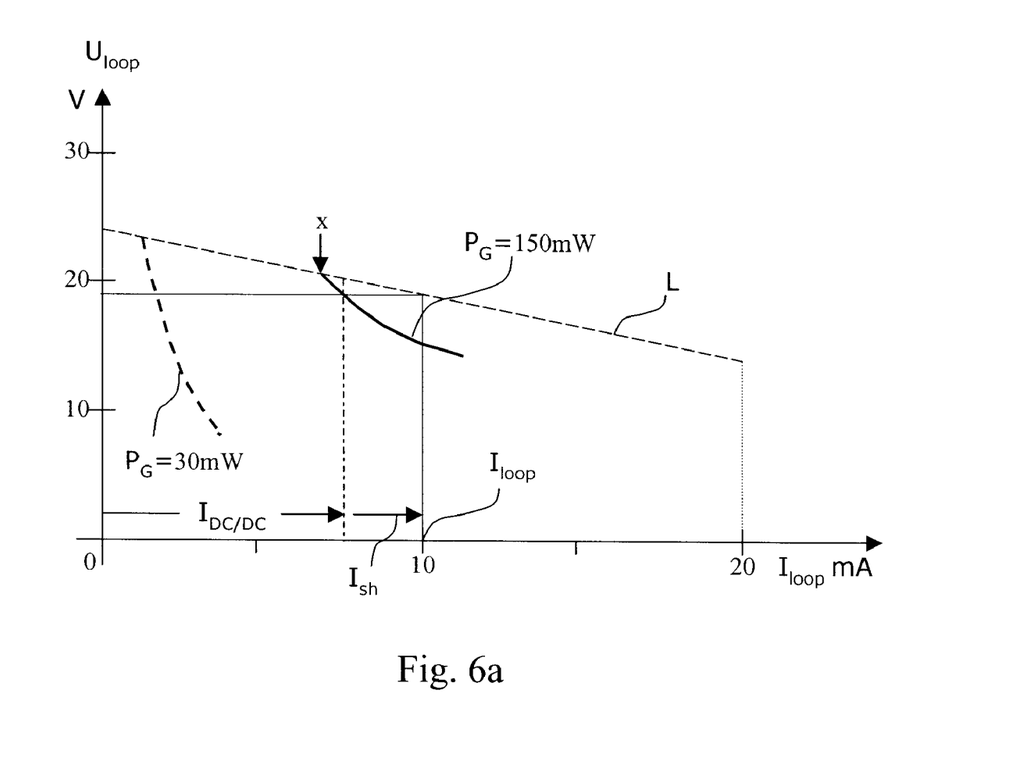
FIGS. 6a to 6c show in diagrams three examples of different operating modes of the feeding of a gauge from a loop where the vertical axis shows the input voltage U to the gauge and the horizontal axis indicates the loop current.
Figure 6B:
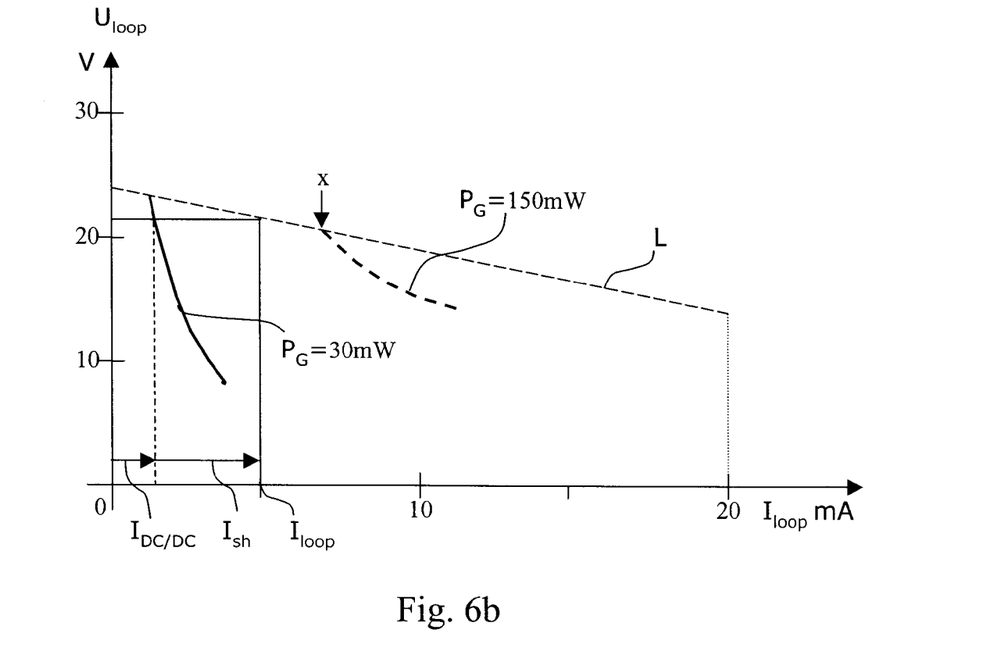
Figure 6C:
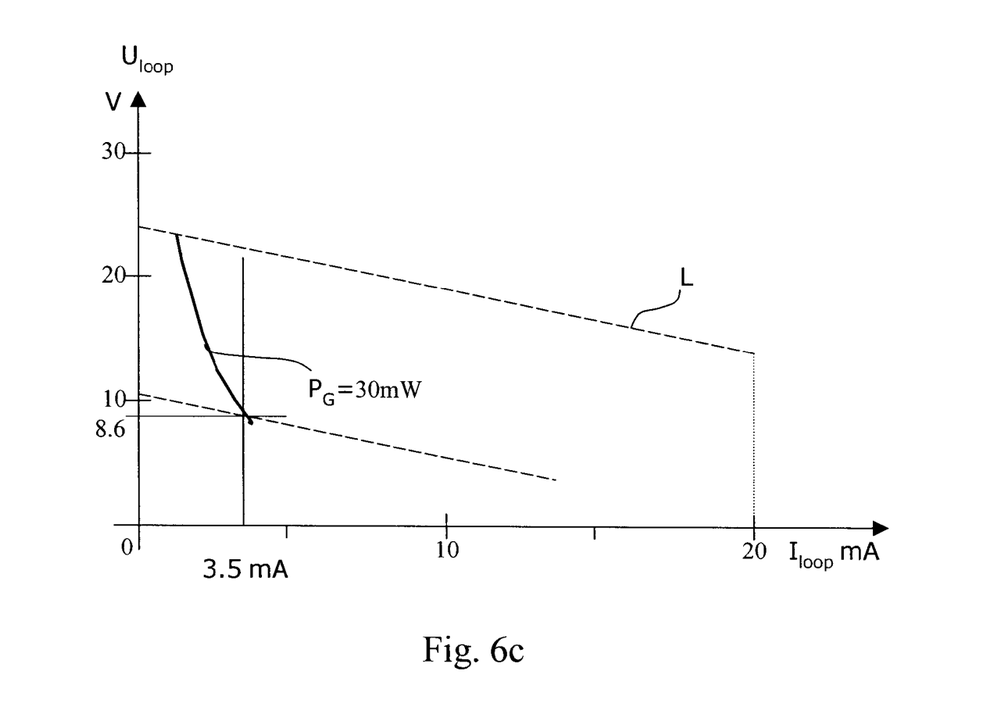

Examples illustrating said supervision of the current through the loop by means of the sensing circuit are shown in FIGS. 6a, 6b and 6c. In these examples the gauge is working in two power modes, which require predetermined (established during design of the gauge) and known power to the gauge supplied via the conduit 31. One of said power modes requiring a lower power for the gauge is a base function mode. A, second, extended power mode provides, beside said base function, extended measure capacity, storing of energy and other available functions earlier mentioned.

The prerequisites in FIGS. 6a and 6b are: supply voltage to the loop 24V and in FIG. 6c variable voltage; the resistance in the loop being 500 ohms. The power controller 41 can switch between the base mode, symbolised by means of user 42, wherein the gauge consumes 30 mW from the loop and the extended mode, symbolised by means of user 43, wherein the gauge consumes 150 mW from the loop. These values should be seen as examples only and not limiting the scope of the invention.

In FIGS. 6a to 6c, the vertical axis shows the input voltage $U_{loop}$ to the gauge. The horizontal axis shows the current in the loop, $I_{loop}$. FIG. 6a illustrates the currents of the gauge operating in extended mode. By the given values the voltage at the input to the gauge follows the load line L indicated. The curve PG=150 mW shows the power consumption for the gauge in the extended mode. As shown in the figure an actual example is given, where the measured value conveyed by the gauge corresponds to a current $I_{loop}$=10 mA. The voltage $U_{loop}$ is then around 19 V and the current $I_{DC/DC}$ drawn by the gauge can be read from the diagram to amount to around 7.9 mA. To provide the correct loop current the current generator has to generate a current around 2.1 mA. The sensing circuit 38 detects that the current in the loop is sufficient to allow the extended mode to prevail. The arrow "x" indicates the point where a switch to base mode takes place.

An example of base mode operation for the gauge is illustrated in the diagram of FIG. 6b. The curve PG=30 mW shows the power consumption for the gauge in the base mode. The measured value conveyed by the gauge corresponds to a current $I_{loop}$=5 mA. The voltage $U_{loop}$ is then around 21.5 V. The current $I_{DC/DC}$ drawn by the gauge can be estimated to around 1.4 mA. To provide the correct loop current in this case, the current generator has to generate a current around 3.6 mA. The sensing circuit 38 detects that the loop current is enough for base mode operation only.

FIG. 6c illustrates "lift-off", which means that the threshold for full function of the gauge is reached due to the voltage $U_{loop}$ being to low. In a case where the loop is supplied from a variable voltage source, it is illustrated an example, where the loop current is 3.5 mA. In this case the current level line meets the curve PG=30 mW at the voltage 8.6 V. A voltage level below this value 8.6 V cannot maintain the lowest allowable current through the loop. The sensing circuit 38 initiates an alarm signal on conduit 44.

What is claimed is:

1. A radar level gauge using microwaves and cowplable to a two-wire process control loop for measuring a level of a surface of a product in a tank comprising:

a microwave antenna unit directable into the tank, a microwave source for sending a microwave signal through the antenna unit into the tank, a microwave receiver for receiving a reflected microwave signal from the surface of the product in the tank, measurement circuitry coupled to the source and receiver for initiating transmission of the microwave signal and for determining product level based upon the received signal, output circuitry coupled to the two-wire process control loop for setting in the loop a desired value of a loop current ($I_{loop}$) corresponding to the product level, a power supply circuitry coupled to the two-wire process control loop for receiving power from the loop and being a source of power for the low power microwave source, the low power microwave receiver, the measurement circuitry and the output circuitry and including a converter for transferring power from the loop to said powers supply circuitry by means of feeding a first current ($I_{DC/DC}$) from the loop to the power supply circuitry, a current generator included in said output circuitry for generating in parallel to said first current a second current ($I_{sh}$) in the loop for maintaining said loop current at a value corresponding to said product level and a sensing circuit for determining the value of said second current and having an output indicative of the value of said second current.

2. A radar level gauge according to claim 1, wherein the process control loop is a 4–20 mA process control loop.

3. A radar level gauge according to claim 1, wherein the gauge has loop current measurement means for measuring the value of the loop current ($I_{loop}$); the output circuitry has means for sending a value of said desired loop current to a comparator; said comparator generating a drive signal based on the difference between the value of the loop current and the value of the desired loop current, and the comparator sending said drive signal to the current generator for setting the loop current.

4. A radar level gauge according to claim 3, wherein said sensing circuit determines the value of the second current based on said desired loop current, said drive signal and the loop current.

5. A radar level gauge according to claim 1, wherein the sensing circuit delivers said output to a power controller programmed to determine a value of surplus power available based on the value of the generated second current ($I_{sh}$).

6. A radar level gauge according to claim 5, wherein the sensing circuit delivers said output to a power controller programmed to supervise distribution of said surplus power in the gauge and to direct said surplus power to users in the gauge.

7. A radar level gauge according to claim 5, wherein the sensing circuit delivers said output to a controller programmed to send an alarm signal via the loop, when said controller identifies that the power available via the loop being insufficient to energize the gauge.

8. A radar level gauge according to claim 5, wherein the sensing circuit delivers said output to a power controller programmed to start additional power consuming processes in the gauge when said surplus power is available and to stop said additional processes when said surplus is not available.

9. A radar level gauge according to claim 4, wherein the sensing circuit delivers said output to a power controller programmed to direct surplus power to a power storage from the group of:

a capacitor, a chargeable battery.

10. A radar level gauge according to claim 1, wherein the sensing circuit delivers said output to a controller programmed to send an alarm signal via the loop, when said controller identifies the power available via the loop being insufficient to energize the gauge.

11. A radar level gauge according to claim 1, wherein said output controls the switching of the gauge for operating in a base mode and an extended mode; said base mode operation requiring less power than said extended mode operation.

12. A radar level gauge according to claim 1, wherein said output controls the initiating of an alarm, when said sensing circuit detects that the current generated in the current generator is in a predetermined range close to zero.

13. A radar level gauge using microwaves and couplable to a two-wire process control loop for measuring a level of a surface of a product in a tank comprising:

a microwave antenna unit directable into the tank, a microwave source for sending a microwave signal through the antenna unit into the tank, a microwave receiver for receiving a reflected microwave signal from the surface of the product in the tank, measurement circuitry coupled to the source and receiver for initiating transmission of the microwave signal and for determining product level based upon the received signal, output circuitry coupled to the two-wire process control loop for setting in the loop a desired value of a loop current ($I_{loop}$) corresponding to the product level, a power supply circuitry coupled to the two-wire process control loop for receiving power from the loop and being a source of power for the low power microwave source, the low power microwave receiver, the measurement circuitry and the output circuitry and including a converter for transferring power from the loop to said power supply circuitry by means of feeding a first current ($I_{DC/DC}$) from the loop to the power supply circuitry, a current generator included in said output circuitry for generating a second current ($I_{sh}$) in the loop for maintaining said loop current at a value corresponding to said product level and a sensing circuit for determining the value of said second current and for sending an alarm via the loop when the value of said second current indicates that the power available via the loop is insufficient to energize the gauge.

14. A method for transferring power from a two-wire process control loop to a radar level gauge for measuring a level of a product in a tank comprising the steps of:

directing an antenna unit into the tank, sending by means of a microwave source a microwave signal through the antenna unit into the tank, receiving by means of a receiver a microwave signal reflected from a surface of the product in the tank, initiating transmission of the microwave signal and determining product level based upon the received signal in a measurement circuit coupled to the source and the receiver, setting in an output circuitry situated in the radar level gauge and coupled do the two-wire process control loop a loop current value ($I_{loop}$) corresponding to the product level, transmitting information related to product level over the loop via said output circuitry, supplying power from the loop to a power supply circuitry being a source of power for the microwave source, the microwave receiver, the measurement circuitry and the output circuitry and transferring power from the loop to said power supply circuitry by means of feeding a first current from the loop to the power supply circuitry, generating a second current ($I_{sh}$) in the loop for maintaining said loop current at the value corresponding to said measured value of said product level, determining in a sensing circuit a value of the second current sending an alarm via the loop when the value of said second current indicates that the power available via the loop is insufficient to energize the gauge and outputting from said sensing circuit an output signal indicating the value of said second current.

15. A method according to claim 14, further comprising the steps of:

establishing in the gauge a desired value of said loop current, comparing the desired value of said loop current with the actual loop current, generating a drive signal based on the difference between the value of the actual loop current and the value of the desired loop current, sending said drive signal to the current generator for setting the loop current.

16. A radar level gauge according to claim 15, further comprising the step of:

determining in said sensing circuit the value of the second current based on said desired loop current, said drive signal and the loop current.

17. A method according to claim 14, further comprising the step of:

generating said second current in parallel with said first current.

18. A method according to claim 17, further comprising the step of:

determining a value of surplus power available based on the value of the second current ($I_{sh}$).

19. A method according to claim 17, further comprising the step of:

delivering said output signal to a power controller programmed to direct surplus power to users for distributing said surplus power in the gauge.

20. A method according to claim 17, further comprising the step of:

delivering said output signal to a power controller programmed to send an alarm via the loop when the value of said second current indicates that the power available via the loop is insufficient to energize the gauge.

21. A method according to claim 17, further comprising the steps of:

delivering said output signal to a power controller, programming the power controller to supervise additional processes when surplus power is available, wherein said additional processes is at least one from the group of; controlling start-up and shut-down of the level gauging system, controlling slow-down processes in the gauge to lower the power consumption, activating stand-by modes, controlling connection and disconnection of alternative modes of operation to affect the power consumption, changing clock speed in digital circuits, changing measurement updating intervals, disconnecting functions in the gauge not necessary for basic measurement functions, disconnecting service functions, disconnecting maintenance functions.

22. A method according to claim 17, further comprising the step of:

charging in the gauge a power storing means with at least part of the current available from the loop according to said output signal.

23. A method according to claim 22, further comprising the step of:

charging a capacitor or a chargeable battery being said power storing means.

24. A method according to claim 14, further comprising the steps of:

detecting by means of said sensing circuit the lift-off voltage of the gauge and sending through the loop an alarm that said lift-off voltage level is reached.

25. A method according to claim 14, further comprising the step of:

controlling by means of said output signal a switching of the gauge between a base mode and an extended mode.

26. A method according to claim 14, further comprising the step of:

controlling by means of said output signal the initiating of an alarm, when said sensing circuit detects that the current generated in the current generator is zero or at a predetermined value close to zero.

27. A method for transferring power from a two-wire process control loop to a radar level gauge for measuring a level of a product in a tank comprising the steps of:

directing an antenna unit into the tank, sending by means of a microwave source a microwave signal through the antenna unit into the tank, receiving by means of a receiver a microwave signal reflected from a surface of the product in the tank, initiating transmission of the microwave signal and determining product level based upon the received signal in a measurement circuit coupled to the source and the receiver, setting in an output circuitry situated in the radar level gauge and coupled do the two-wire process control loop a loop current value ($I_{loop}$) corresponding to the product level, transmitting information related to product level over the loop via said output circuitry, supplying power from the loop to a power supply circuitry being a source of power for the microwave source, the microwave receiver, the measurement circuitry and the output circuitry and transferring power from the loop to said power supply circuitry by means of feeding a first current from the loop to the power supply circuitry, generating a second current ($I_{sh}$) in the loop for maintaining said loop current at the value corresponding to said measured value of said product level, determining in a sensing circuit a value of the second current, and sending an alarm via the loop when the value of said second current indicates that the power available via the loop is insufficient to energize the gauge.

* * * * *